(12) United States Patent
Amon et al.

(10) Patent No.: US 9,596,504 B2
(45) Date of Patent: Mar. 14, 2017

(54) METHOD FOR ENCODING OF A VIDEO STREAM

(75) Inventors: Peter Amon, München (DE); Norbert Oertel, Landshut (DE); Bernhard Agthe, Feldkirchen (DE)

(73) Assignee: Unify GmbH & Co. KG, Munich (DE)

(*) Notice: Subject to any disclaimer, the term of this patent is extended or adjusted under 35 U.S.C. 154(b) by 1287 days.

(21) Appl. No.: 13/143,628

(22) PCT Filed: Jul. 23, 2010

(86) PCT No.: PCT/EP2010/004543
§ 371 (c)(1),
(2), (4) Date: Jul. 7, 2011

(87) PCT Pub. No.: WO2012/010188
PCT Pub. Date: Jan. 26, 2012

(65) Prior Publication Data
US 2012/0027085 A1  Feb. 2, 2012

(51) Int. Cl.
| | |
|---|---|
| H04N 7/32 | (2006.01) |
| H04N 21/434 | (2011.01) |
| H04N 7/15 | (2006.01) |
| H04N 21/2365 | (2011.01) |
| H04N 19/107 | (2014.01) |
| H04N 19/114 | (2014.01) |
| H04N 19/177 | (2014.01) |

(52) U.S. Cl.
CPC ........... *H04N 21/4347* (2013.01); *H04N 7/15* (2013.01); *H04N 19/107* (2014.11); *H04N 19/114* (2014.11); *H04N 19/177* (2014.11); *H04N 21/2365* (2013.01)

(58) Field of Classification Search
CPC .... H04N 7/15; H04N 21/2365; H04N 19/177; H04N 19/107; H04N 19/114; H04N 21/4347
USPC ........................................ 375/240.12, 240.26
See application file for complete search history.

(56) References Cited

U.S. PATENT DOCUMENTS

| | | | |
|---|---|---|---|
| 6,611,624 B1 * | 8/2003 | Zhang et al. | 382/232 |
| 7,084,898 B1 | 8/2006 | Firestone et al. | |

(Continued)

FOREIGN PATENT DOCUMENTS

| | | |
|---|---|---|
| WO | 03049418 A2 | 6/2003 |
| WO | 2004047444 A1 | 6/2004 |

(Continued)

OTHER PUBLICATIONS

International Preliminary Report on Patentability and Written Opinion for PCT/EP2010/004543 dated Jan. 23, 2013 (German Translation).

(Continued)

*Primary Examiner* — Christopher S Kelley
*Assistant Examiner* — Zhihan Zhou
(74) *Attorney, Agent, or Firm* — Buchanan Ingersoll & Rooney PC

(57) ABSTRACT

A temporal sequence of pictures is generated in a method for encoding of a first video stream. To do so, a synchronization signal is used which is derived from a second video stream independently of the first video stream, or the encoding of a second video stream independent of the first video stream is based on the same principle as for the encoding of the first video stream.

20 Claims, 9 Drawing Sheets

(56) References Cited

U.S. PATENT DOCUMENTS

2006/0018379 A1\* 1/2006 Cooper .................... 375/240.12
2010/0254458 A1\* 10/2010 Amon et al. ............. 375/240.13
2011/0235703 A1\* 9/2011 Labrozzi et al. ........ 375/240.02

FOREIGN PATENT DOCUMENTS

WO  WO 2009049974 A2 \* 4/2009
WO  WO 2010062596 A1 \* 6/2010

OTHER PUBLICATIONS

International Preliminary Report on Patentability and Written Opinion for PCT/EP2010/004543 dated Jan. 23, 2013 (English Translation).
International Search Report of PCT/EP2010/004543 dated Apr. 1, 2011.

\* cited by examiner

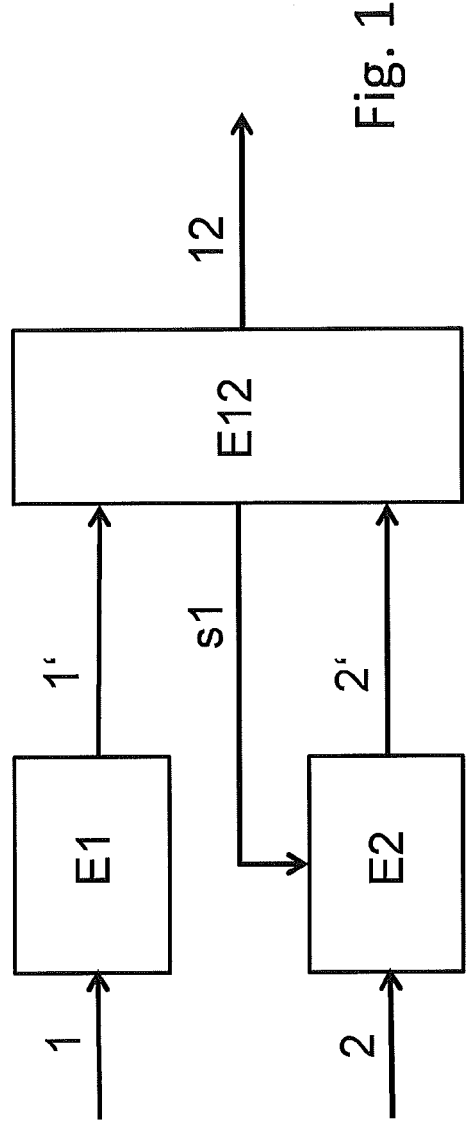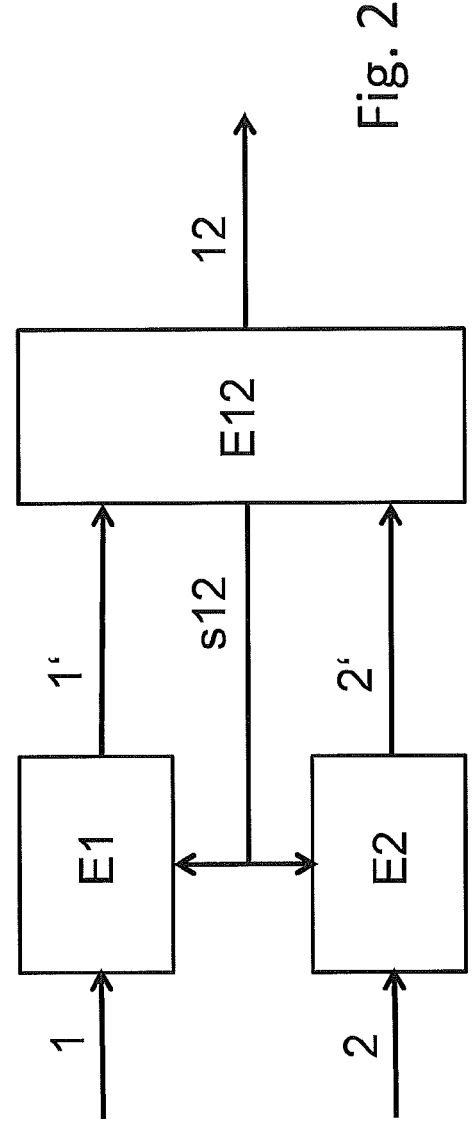

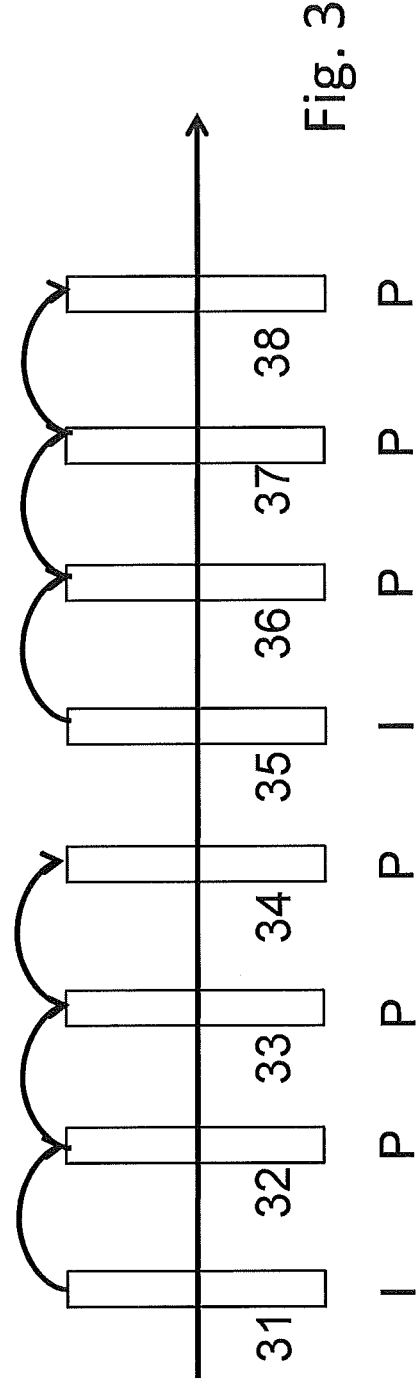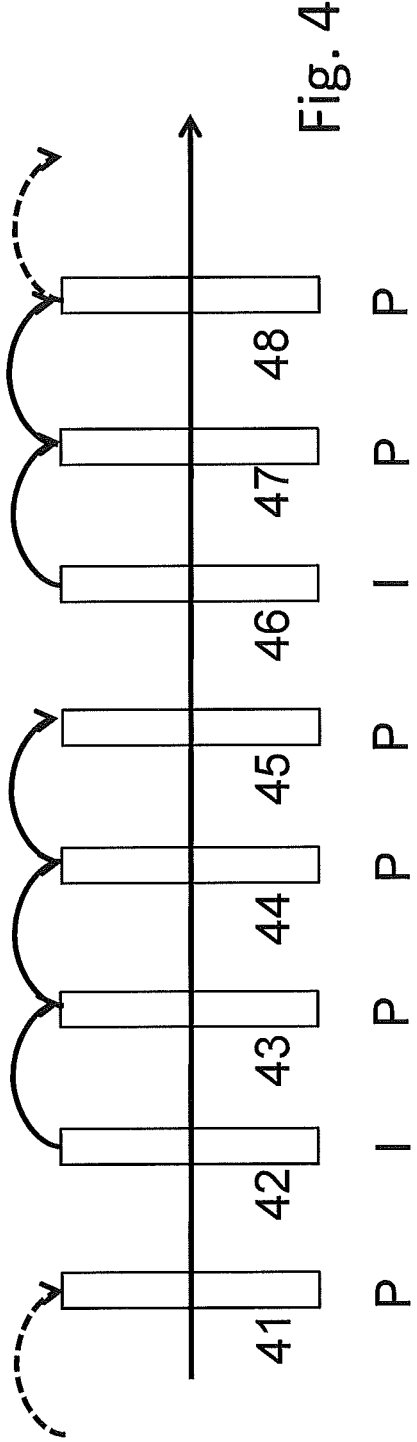

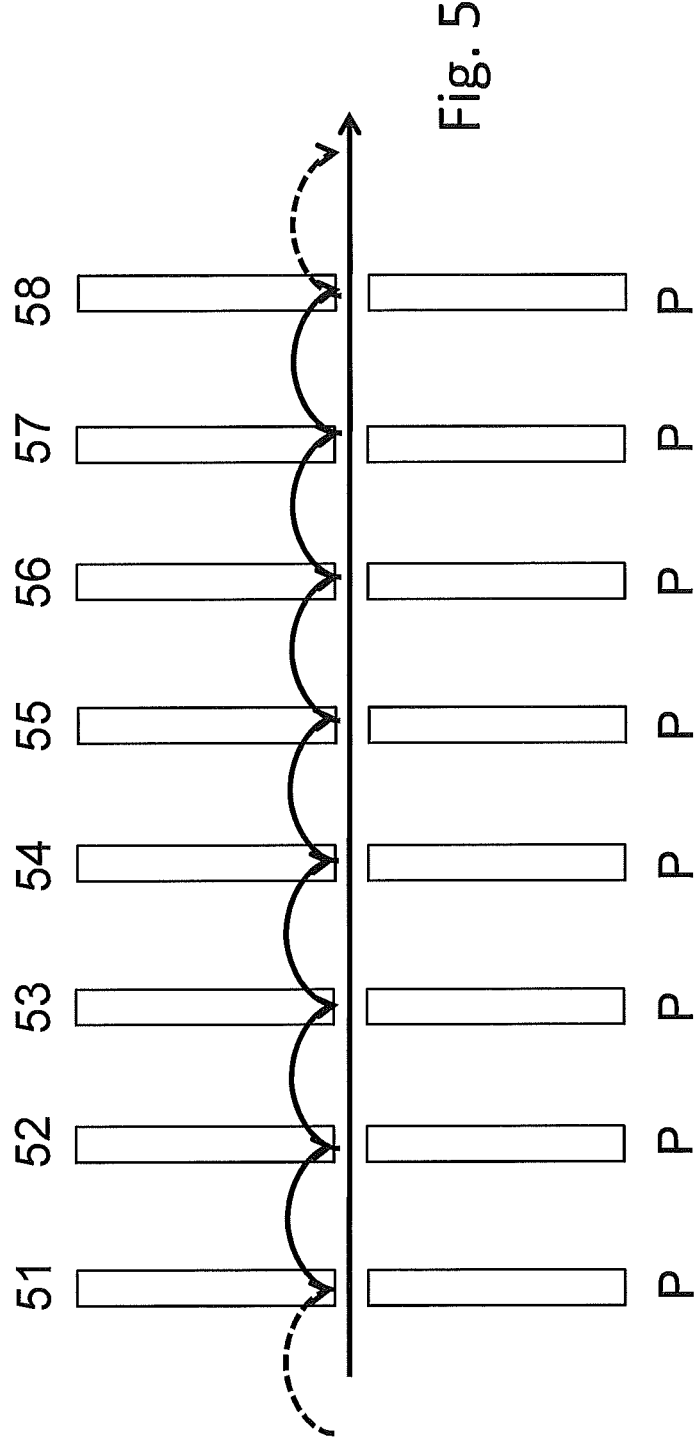

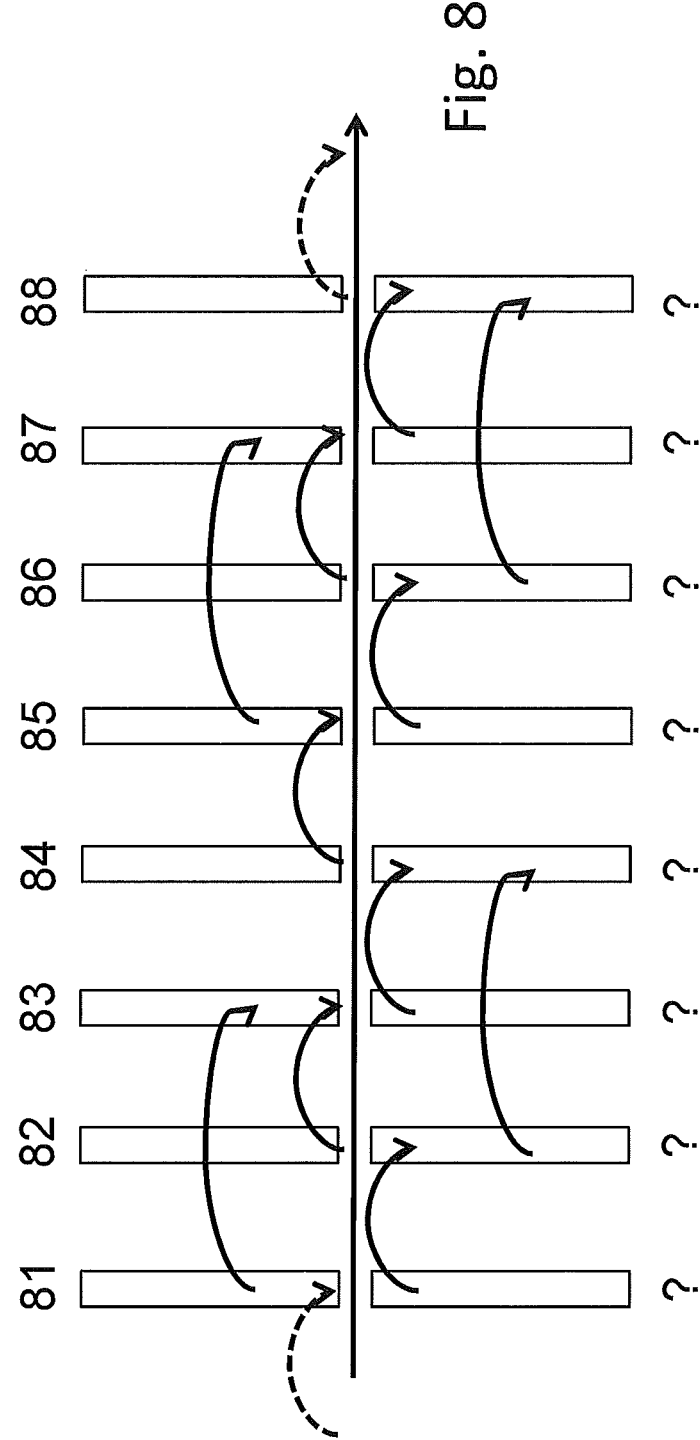

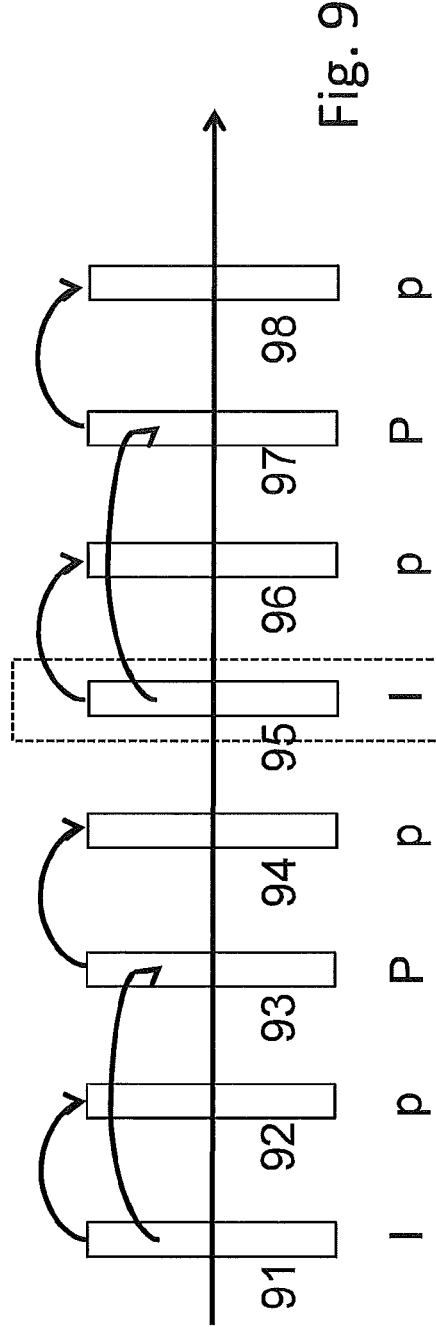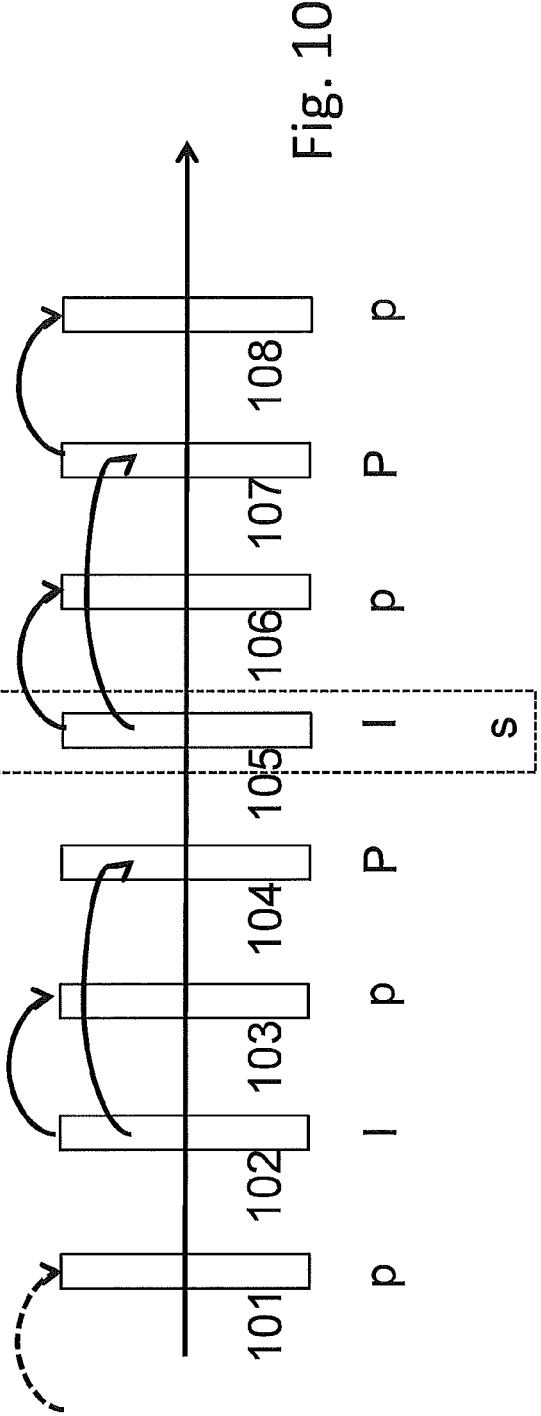

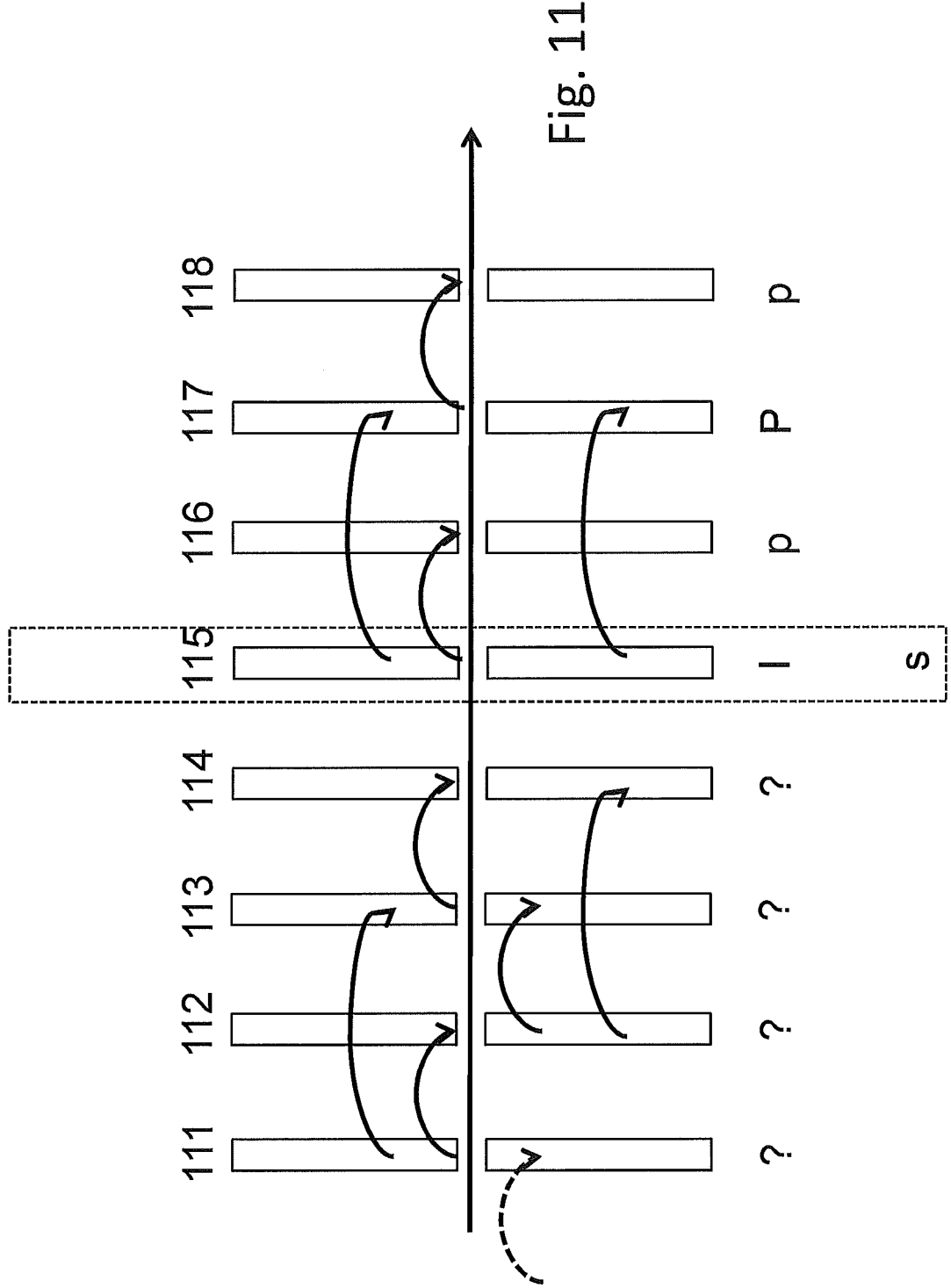

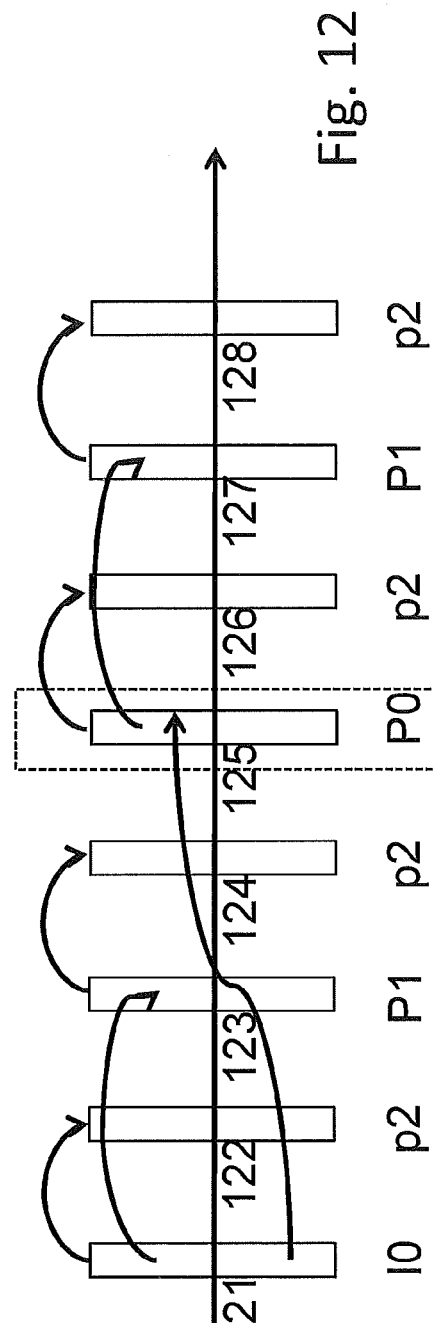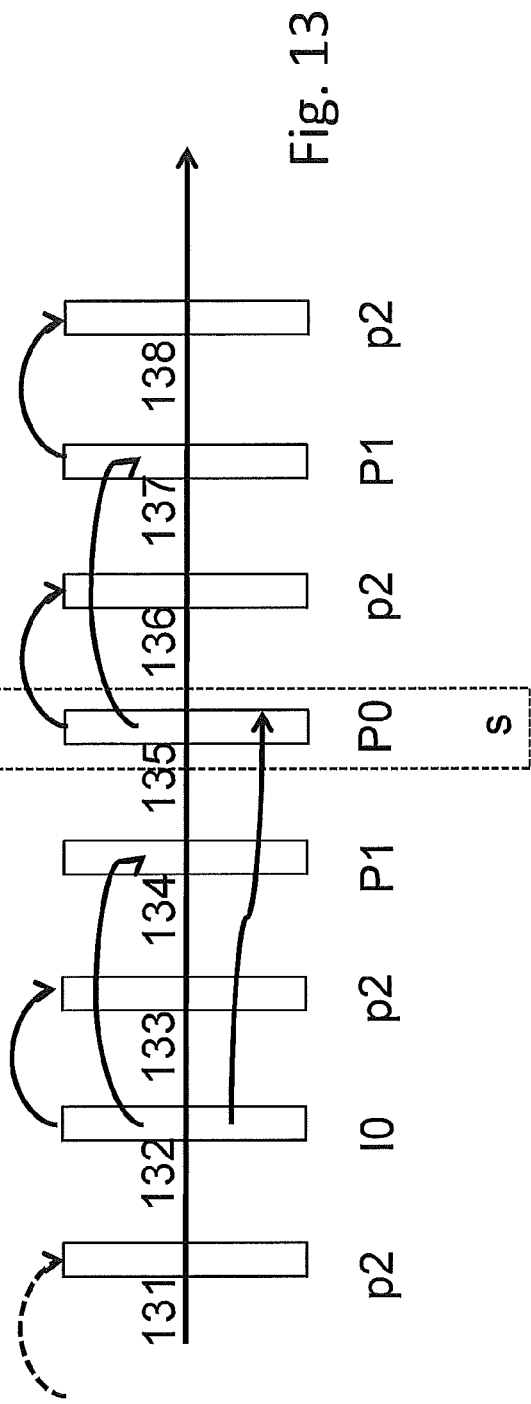

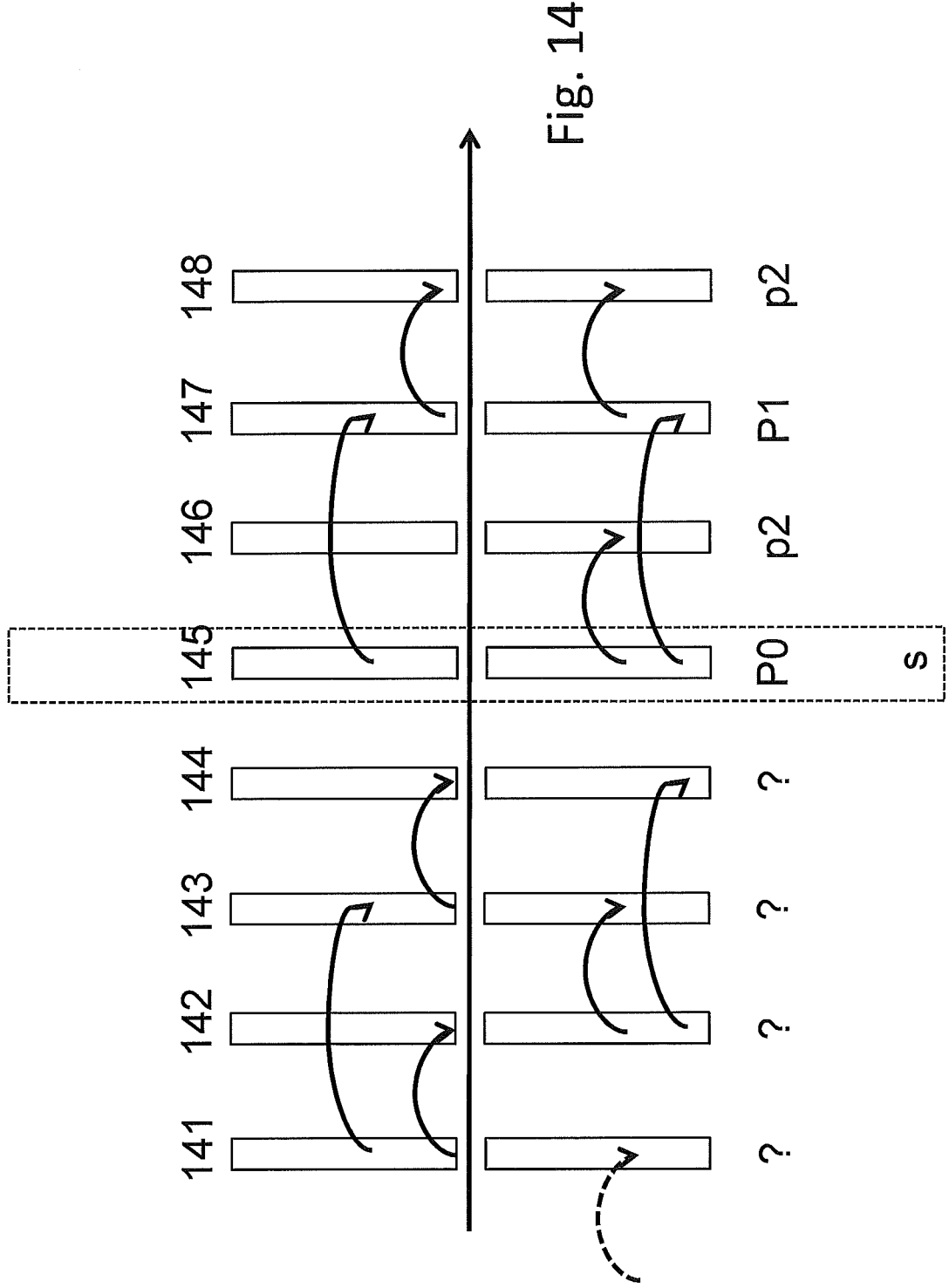

METHOD FOR ENCODING OF A VIDEO STREAM

CROSS-REFERENCE TO RELATED APPLICATIONS

This application is the United States nation phase under 35 U.S.C. §371 of PCT International Patent Application No. PCT/EP2010/004543, filed on Jul. 23, 2010.

BACKGROUND OF THE INVENTION

Field of the Invention

Embodiments relate to a method for encoding of a video stream, a method for mixing of two video streams, a method to implement a video conference and a device for implementing or supporting such methods.

Background of the Related Art

Methods for video encoding, that is, for encoding of video data streams, are already being widely used today in many areas of engineering. In the case of video conference systems, the video streams of several participants are usually combined ("mixed") into one single video stream. In this kind of combining or mixing, an encoded output video stream is generated from two encoded input video streams, for example, for common display of the two video streams. A method of this kind is described, for example, in WO 2009/049974 A2.

BRIEF SUMMARY OF THE INVENTION

Embodiments specify a method for encoding of a video stream which can be used for such applications, in particular in conjunction with video conferences.

Accordingly, embodiments provide that in the generation of the encoded sequence of pictures, a synchronization signal is used which is derived from a second video stream independently of the first video stream, or the encoding of a second video stream independently of the first video stream is based on the same principle as for the encoding of the first video stream.

BRIEF DESCRIPTION OF THE FIGURES

The figures show:

FIG. 1: A schematic view of one preferred exemplary embodiment of an invented method for encoding of a video stream;

FIG. 2: A schematic view of an additional, preferred exemplary embodiment of an invented method for encoding of a video stream;

FIG. 3: A first video stream with a first prediction structure with a so-called IPPP-encoding;

FIG. 4: A second video stream with a second prediction structure with a so-called IPPP-encoding;

FIG. 5: an output video stream produced by mixing of the video streams shown in FIGS. 3 and 4, in which the prediction structures are not synchronized according to the invention;

FIG. 8: an output video stream produced by mixing of the video streams shown in FIGS. 6 and 7, in which the prediction structures are not synchronized according to the invention;

FIG. 9: The video stream shown in FIG. 6 with a synchronization signal s according to the invention;

FIG. 10: A video stream modified according to the invention and with a shortened picture group length and with a synchronization signal s according to the invention;

FIG. 11: an output video stream produced by mixing of the video streams shown in FIGS. 9 and 10, in which the prediction structures are synchronized according to the invention;

FIG. 12: A video stream with a "hierarchical" prediction structure in which one group with 7 P-frames depends on a non-prediction-encoded I-frame.

FIG. 13: A video stream with a "hierarchical" prediction structure with a picture group length shortened by the synchronization signal s according to the invention, in comparison to the illustration in FIG. 12;

FIG. 14: An output video stream produced by mixing the video streams synchronized according to the invention and shown in FIGS. 12 and 13.

DETAILED DESCRIPTION OF THE INVENTION

Figure 6:
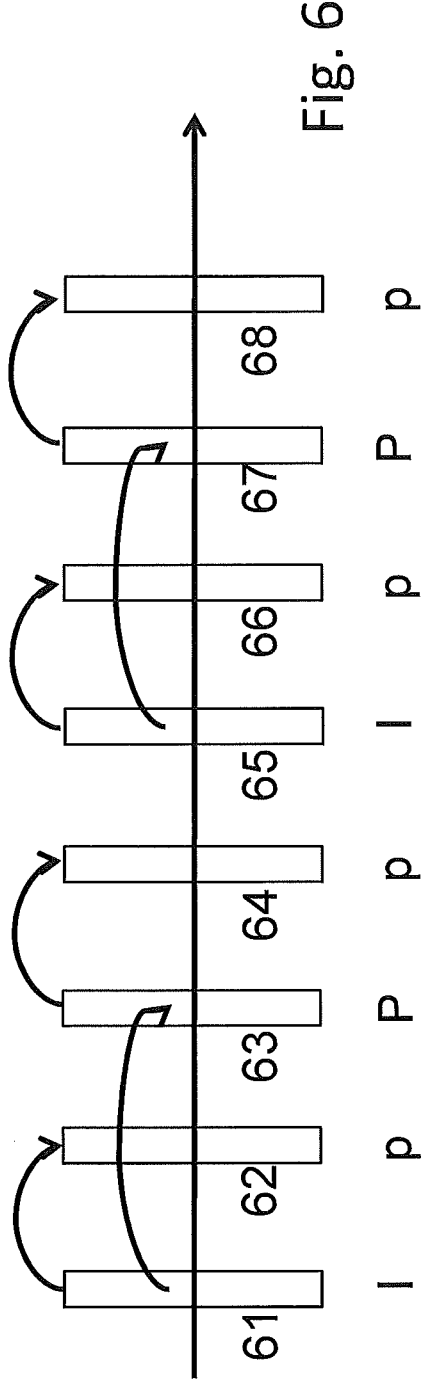
FIG. 6: A third video stream with a third "hierarchical" prediction structure.

The derivation of a signal or of an information item from a data stream, in particular of a synchronization signal from a video stream, is understood to be in particular in connection with the description of the present invention, any kind of generation of one such signal or of one such information item, in which structural properties of the data stream from which the signal or the information item is derived, are used for generation of the derived signal or of the derived information item. Since a data stream relates to a time sequence of data or data groups, for example, of pictures, picture points or blocks of picture points, the structure of one such data stream is determined by the structural properties of these data or data groups and their association to time points. In the exemplary case of a data stream of a temporal sequence of equivalent data blocks—that is, data blocks constructed according to a particular pattern—which are each associated with a particular point in time, a synchronization signal could be derived from this data stream, for example by detection of these time points and by generation of a signal which describes these time points. Additional examples for the derivation of a signal or of an information item from a data stream, in particular of a synchronization signal from a video stream will be provided in the further course of the description of preferred embodiments of the invention.

Therefore, in the invented method a first video stream is produced by means of a synchronization signal which is derived from a second video stream independent of the first video stream, or which indeed is not derived from this second video stream, but is based on the encoding of the second video stream in a manner corresponding to the encoding of the first video stream. Therefore this synchronization signal can also be an external synchronization signal, for example, a simple timing signal which is used in a corresponding manner as the basis for encoding of at least two of the encoded video signals.

In the encoding, that is, in the compression of video streams or of sequences of moving pictures, the data reduction associated with the compression is achieved essentially in two ways: Firstly, single pictures are compressed with a preferably block-based method, for example, by means of a method known as discrete cosine transformation (DCT). This method roughly corresponds to the known JPEG-standard for single pictures. In addition, dependencies (correlations) between sequential, single pictures in which the picture content often differs very little, are used for the data reduction. For this purpose, so-called prediction structures are introduced in which preferably three picture types (also known as frames) are used:

The frames known as I-frames are saved without using the correlation between sequential pictures. These frames thus do not depend on the following or preceding frames. Since only picture content of this one frame is used for encoding of these pictures, these pictures are also known as "intra-coded" pictures. Thus we have the name I-frame.

The so-called P-frames are additionally predicted from a preceding P or I-frame and are thus also known as predicted frames.

And the B-frames get their name because these frames are bidirectionally interpolated and/or predicted. In contrast to the P-frames, references to a following P or I-frame may additionally be present. However, for decoding of a B-frame, the following referenced frame must already have been decoded, such that a larger number of saved frames is needed and the total delay time of the decoding process is often increased.

A time sequence of these picture types characterizes a so-called prediction structure. Thus in this regard we are dealing with a structural property of a video stream from which preferably a synchronization signal or a corresponding information item can be derived. For example, a synchronization signal of this kind can be derived from the prediction structure of a video stream, wherein the time points which are allocated to I-frames in this video stream, for example, are introduced in the synchronization signal. Other possibilities for derivation of a synchronization signal from a video signal will be provided below in the description of preferred embodiments of the invention.

In connection with the description of the present invention, the concept of encoding (also: encoding, coding) means the digital representation of a video stream, that is, of a data stream which represents a video signal, that is, a temporal sequence of digital or digitized pictures, associated preferably with a reduction in the data volume (data compression, compression). Decoding of this kind of encoded video stream usually produces a data stream which allows a replay or processing of the video signals.

In one preferred embodiment of the present invention, the sequence of frames includes prediction-encoded pictures, in particular P-frames, and non-prediction encoded pictures, in particular I-frames, and the synchronization signal, is used for synchronization of the positions of non-prediction encoded pictures, in particular of I-frames, in the two sequences of pictures of the two independent video streams. In the first case that the synchronization signal is derived from the second video stream, the synchronization signal is used preferably to control the positions of non-prediction-encoded pictures in the first video stream. In the other case, where the synchronization signal is used for encoding of the two video streams in a corresponding manner, the positions of non-prediction-encoded pictures in both sequences of pictures is controlled in a corresponding manner.

The prediction of pictures makes use of the fact that certain picture portions in the temporally sequential pictures change only very little, or merely assume a different position in the following picture. Under these prerequisites, a prediction of future picture content is possible with the aid of motion vectors which indicate the shift of picture portions between sequential pictures. However, usually residual differences between the picture block being encoded remain, which then can be encoded, for example, by means of a discrete cosine transform and subsequent quantizing.

According to an additional, preferred embodiment, the invention provides that the synchronization signal is generated by a device for mixing of the first and second video stream. Examples of such devices are video conference systems, in particular the server used in the process, which makes available a plurality of encoded video streams to various video conference participants through subscriber terminals. The synchronization signal in this case contains an information bit relating to the time offset between the positions of non-prediction coded pictures, in particular of I-frames, in the two sequences of pictures of the two independent video streams, or is derived from one such information item.

In another preferred embodiment, the synchronization signal contains an information item relating to the number of prediction-encoded pictures, in particular the P-frames or the B-frames, which follows a non-prediction encoded picture, in particular after an I-frame, in at least one of the two video streams until the arrival of an additional prediction-encoded picture, or is derived from one such information item.

The method according to the invention and the various exemplary embodiments are suitable for mixing two video streams, wherein at least one of these video streams is or was encoded according to a method of the kind described above. Therefore, these methods are also suitable for implementation of a video conference in which at least two video streams are mixed according to one of the named methods.

As a preferred embodiment of a method of this kind for implementing a video conference, the invention provides that upon arrival of an additional participant in the video conference, said participant's video stream is initially encoded non-synchronized, and that said participant's video stream is synchronized as soon as a device for mixing of video streams can generate a synchronization signal according to one of the preceding or following claims. Particularly preferred in this regard is an embodiment of the method in which a device for mixing video streams signals a desired prediction structure before or during the synchronization.

The present invention can also be implemented by means of an apparatus to implement or to support one of the named methods, said apparatus being designed to generate and transmit or to receive or to process a synchronization signal according to one of the described methods.

The invention will be explained in greater detail below based on the figures and with the aid of preferred, exemplary embodiments.

FIGS. 3, 4 and 5 show the mixing of two video streams with an IPPP-encoding, in which the prediction structures are not synchronized according to the invention. In the video stream illustrated in FIG. 3, the pictures 31, 32, 33, 34, 35, 36, 37 and 38 follow each other in time. Pictures 31 and 35 are not prediction-encoded ("intra-encoded") I-frames. Pictures 32, 33, 34, 36, 37 and 38 are prediction-encoded P-frames. I-frames 31 and 35 encoded without reference to another picture can be decoded without reference to any other picture. The P-frames are encoded by means of a prediction of their picture content on the basis of a preceding picture, and thus can only be decoded with the aid of the picture content of this preceding picture.

Accordingly for the video stream illustrated in FIG. 4 and composed of the I-frames 42 and 46 and the P-frames 41, 43, 44, 45, 47 and 48, with the difference that the I-frames 42 and 46 appear in the video stream illustrated in FIG. 4, at time points when the P-frames 32 and 36 appear in the video stream illustrated in FIG. 3. For decoding of the P-frame 41, knowledge of the picture content of a picture preceding picture 41 is required and not illustrated in FIG. 4. Picture 48 is needed for decoding of a picture (not illustrated in FIG. 4) which follows picture 48 in time.

In FIGS. 3 and 4, the individual picture groups ("groups of pictures," GOPs) indeed do have the same length; however, the starting points of the picture groups, namely the I-frames 31, 35, 42 and 46, are shifted in time with respect to each other. The point in time when the non-prediction-encoded I-frames 42 and 46 appear in the video stream shown in FIG. 4 corresponds to that point in time in the video data sequence illustrated in FIG. 3, when the prediction encoded P-frames 32 and/or 36 appear in the latter video data sequence. Thus when mixing the two video streams shown in FIGS. 3 and 4 without a synchronization according to the invention, all pictures in the output video stream shown in FIG. 5 are prediction-encoded P-frames, namely pictures 51 to 58. All pictures are connected through references to neighboring pictures.

This phenomenon then means that there are no random access points for the output video stream, which is a disadvantage for the reliability of the method and for its fault tolerance.

In the case of hierarchical encoding, an additional problem appears. A hierarchical encoding enables a temporal scalability, which makes possible, in part, the realization of improved error-resilient methods. For example, in video streams with temporal scalability, the time base-plane, that is, the lowest time resolution step, can be easily shielded in order to prevent uncontrolled error propagation. In contrast thereto, in an IPPP-encoding with the loss of one P-frame, all following P-frames no longer can be decoded without error.

In the video stream shown in FIG. 6, the P-frames 63 and 67 do not depend on their respective preceding p-frames 62 and/or 66, but rather on their respective preceding I-frames 61 and/or 65. But in contrast, the p-frames 64 and 68 depend on their preceding P-frames 63 and/or 67. This applies similarly to the video stream shown in FIG. 7. The P-frames 74 and 78 do not depend on their respective preceding P-frames 73 and/or 77, but rather on their respective preceding I-frames 72 and/or 76. But in contrast, the p-frames 71 and 75 depend on their preceding P-frames 70 and/or 74, wherein the P-frame 70 is not shown in FIG. 7.

Figure 7:
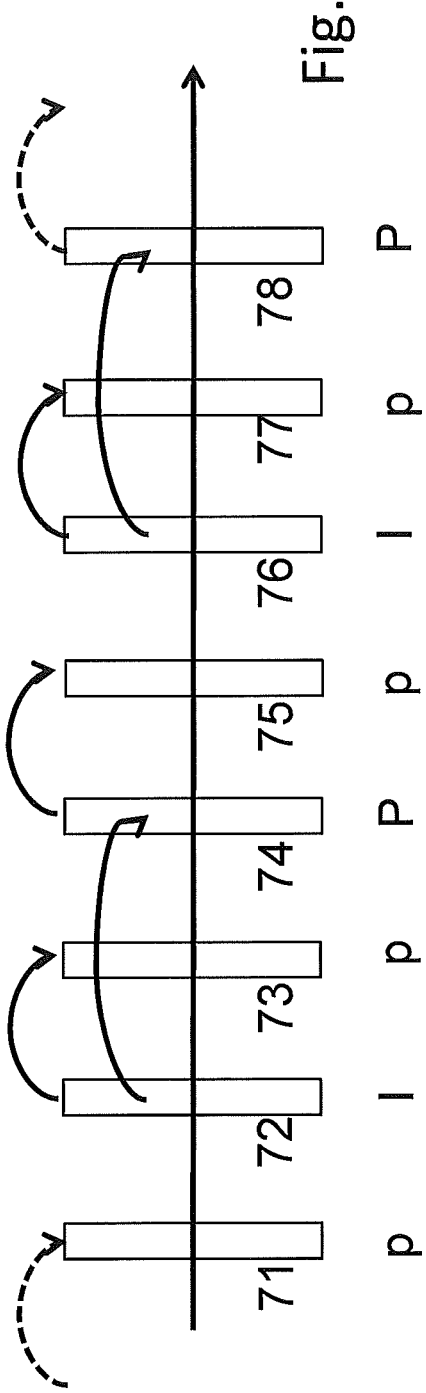
FIG. 7: A fourth video stream with a fourth "hierarchical" prediction structure.

As is shown in FIGS. 6, 7 and in particular in FIG. 8, this hierarchical prediction structure—when mixing the video streams shown in FIGS. 6 and 7—leads to the problem that numerous pictures, namely pictures 83, 84, 87 and 88 in the output picture sequence shown in FIG. 8, will have dependencies on several previous pictures, that is, on several reference pictures, which are also known as "multiple references," which usually results in an increased memory requirement.

For example, picture 83 depends on pictures 81 and 82; picture 84 depends on pictures 82 and 83; picture 87 depends on pictures 85 and 86, and picture 88 depends on pictures 86 and 87. These kinds of multiple references increase the probability of errors in the decoding and often also increase the expense for encoding and decoding. Moreover, these multiple references cannot be reflected in many video coding standards, and the temporal scalability is also lost, which is indicated in FIG. 8 by the "?"-symbol. This results in a greater error susceptibility in the decoding of the output video stream.

But now the invention solves this problem as illustrated in FIGS. 1 and 2, through the control of encoding E1 and/or E2 of at least one video data stream 1 and/or 2 as a function of a synchronization signal s1 and/or s12, which is provided in the embodiments shown in FIGS. 1 and 2 through a device E12 for mixing of the video data streams 1 and/or 2, and/or of their encoded versions 1' and/or 2'. The encoders E1 and/or E2 encode the video streams 1 and/or 2 and generate the encoded video streams 1' and/or 2', respectively. Then in the embodiment shown in FIG. 1, these video streams are sent the device E12 for mixing the two video streams, whereupon or wherein this device creates the synchronization signal s1, which is sent to the device E2 and is used therein for encoding of the video stream 2.

In the exemplary embodiment illustrated in FIG. 1, the synchronization signal s1 is sent only to the encoder E2, but not to encoder E1. Nonetheless, synchronization is possible because in this embodiment of the invention, the synchronization signal s1 is derived from the video stream 1 and/or 1'. Now the synchronization signal derived from video stream 1 and/or 1' thus contains information for the synchronization of the encoding E2 of the video stream 2, which is derived from the structural properties of video stream 1', for example, from its prediction structure. The device for mixing E12 generates the mixed video stream 12 by using the video streams 1' and 2' synchronized according to the invention.

In the exemplary embodiment of the invention illustrated in FIG. 2, the synchronization signal s12 is sent to the two encoders E1 and E2. Therefore, this synchronization signal s12 need not be derived from one of the two video streams. Instead, this may be related also to an external signal, for example, a timing signals which is used by both encoders E1 and E2—in a corresponding manner—for synchronization. The expression "in a corresponding manner" in this regard means that the synchronization signal is used by both encoders E1 and E2 algorithmically in the same manner for encoding of the respective video streams 1 and 2.

In the method according to the invention, a synchronization signal is used which is derived from a second video stream independently of the first video stream, or the encoding of a second video stream independent of the first video stream is based on the same principle as for the encoding of the first video stream. Therefore one essential idea of the invention is to synchronize the input video streams, preferably their prediction structure, in order in this manner to generate an improved output video stream during mixing.

For this purpose the invention provides for the control of at least one of the two encoders such that this kind of synchronizing can occur. In order to achieve a synchronization of video streams with a default prediction structure, two fundamental means are suitable, and they can be combined with each other: The signaling of shifts by a central server, for example, by a device for mixing the video streams, or the use of a common temporal basis. Both methods or a combination thereof can be supplemented by a precision control of the picture repetition rate.

The device E12, for example, a server which implements the mixing of the input video streams 1' and 2', can calculate the time offset of the input data streams, for example. In order to eliminate the calculated offset by means of the synchronization, this device E12, e.g. a server in a video conference system, sends an instruction to the video encoder of the corresponding video data source(s) ("end points") with a prompt to reduce the number of pictures in a group of pictures ("GOP") by the currently calculated offset. In an additional embodiment of the invention, the length of the group of pictures can also be extended, or a combination and/or a mixed form of a shortened or a lengthened group of pictures can be used. In the event that the length of the group of pictures of the input video streams is still not equal, then it will also be transmitted as a new parameter.

This procedure is illustrated, for example, in FIGS. 9, 10 and 11. The synchronization signal s of the device E12 for mixing the input video streams to the encoder for the video stream illustrated in FIG. 10 could consist roughly of an instruction to shorten the length of the group of pictures by one picture. The encoder could then execute this instruction at the next opportunity that results.

For example, FIG. 9 shows a video stream with pictures 91 to 98 consisting of two groups of pictures from pictures 91 to 94 and pictures 95 to 98. The respective first pictures 91 and 95 of a group of pictures in this example are I-frames, all other pictures 92, 93, 94, 96, 97 and 98 are P-frames or p-frames. The difference between the upper-case letter and the lower-case letter is thus used to indicate that the pictures belong to different levels of the time resolution.

This situation corresponds to the situation shown in FIG. 6. Now in order to avoid the problems illustrated in FIG. 8, the encoder of the video stream illustrated in FIG. 7 will be triggered by the synchronization signal to shorten the length of the group of pictures. From the video stream shown in FIG. 7, we then have the video stream illustrated in FIG. 10, in which prediction-encoded picture 75 does not follow prediction-encoded picture 74, but rather in which the non-prediction encoded I-frame 105 follows the prediction-encoded picture 104. Therefore, the encoder is caused by the synchronization signal to encode picture 105 without reference to a preceding picture, i.e. to generate a non-prediction-encoded I-frame 105.

When mixing these two video streams synchronized according to the invention and illustrated in FIGS. 9 and 10, the output video stream illustrated in FIG. 11 is generated, in which the multiple references of pictures 87 and 88 do not appear, as shown in FIG. 8. None of the pictures 116, 117 or 118 is dependent on more than one preceding picture.

But a group of pictures need not necessarily begin with an intra-frame (I-frame), rather they can also begin with a prediction-encoded picture, as is shown in FIGS. 12, 13 and 14. In this manner we can avoid a short term rapid increase in the data rate in the network due to the simultaneous transmission of I-frames from all senders. In this regard, preferably an information item indicating whether the group of pictures is to begin in an intra-frame, can also be additionally signaled and transmitted, or it can be integrated into the synchronization signal.

In several preferred exemplary embodiments of the invention, the prediction structure and the intra-frame interval can be signaled to an encoder in the synchronization signal or in addition to the synchronization signal, as can be seen, for example, in the video streams illustrated in FIGS. 12 and 13. This is an advantage in particular when the prediction structure generated by the encoder does not coincide with the prediction structure expected by the mixer E12. In such cases, for example, the signaling might appear as follows: "I0 p2 P1 p2" with "intra-period=8." The letter symbols therein relate to the picture type, wherein I stands for the intra-frame picture type, P ("capital P") stands for the "P-reference picture" type, p ("small p") stands for the "P-non-reference picture" type. The "intra-period" parameter denotes the temporal scaling step.

In another preferred embodiment of the invention, the information item can also have another content, which however, produces a similar or equal behavior of the addressed encoder. One possibility for the specification would be to instruct the encoder to start the group of pictures with a particular picture number, or if the lengths of the group of pictures do not coincide, to start with a dedicated length of the group of pictures. The corresponding instruction might look as follows: "new group of pictures with group of pictures length equal to x at picture number y." Calculation of the picture number occurs through the server from the shift in the video streams and the delay in the signaling.

In the latter case it must be assured that the signaling packet reaches the encoder before the encoding of the picture number for the new group of pictures. In both the stated cases the signaling can take place, for example, by means of a protocol for real time control of media streams, preferably by means of the RTP Control Protocol (RTCP).

If a new participant arrives in a video conference, then he can start first as non-synchronized with the encoding and sending of the video data. Thus initially a previously, potentially available synchronicity (equal prediction structure) of the other subscribers will be lost. But then the new subscriber will be synchronized preferably as much as possible as soon as the server can calculate the offset, for example. The desired prediction structure can be signaled in advance to the new participant. This can proceed preferably during the establishment of the connection or through the already described, RTCP-like signaling.

The described exemplary embodiments and those to be presented below can also be implemented in combination. The signaling herein can comprise the following elements in general, which can be combined in a suitable manner:

A picture offset or a decrease or increase in the group of pictures length
  A decision on whether a new group of pictures begins with an infra-frame
  The length of the group of pictures
  The prediction structure which implicitly contains an information item about the length of the group of pictures
  The intra-period, that is, the spacing of the intra-pictures These control elements or parameters are derived preferably from a second video stream, that is, they are calculated or determined from its prediction structure or from other structural properties of this video stream. Various examples of this were described above.

The synchronization of the prediction structures can also be attained through a common time basis. Therefore, the invention provides for embodiments in which each end point is first synchronized with a reference time basis. This can occur, for example, by means of the so-called Network Time Protocol (NTP). The communications server E12 which effects the mixing of the video streams 1' and 2' can also be used, for example, as a source for the reference time basis. This kind of situation is illustrated in FIG. 2, for instance.

In one preferred embodiment of the invention, the signaling can proceed such that the server sends a prompt at each end point E1 or E2 to start sending of a particular prediction structure at a particular time. The starting point is thus calculated preferably from the transmission time of the data from the end point to the server. This transmission time of the data from the end point to the server can be estimated, preferably as one-half of the Round Trip Time (RTT), for example. Then timing for the beginning of the new group of pictures can be calculated preferably as follows:

$$T(\text{new group of pictures};i) = T(\text{mixing};i) - T(\text{transmission};i) \approx T(\text{mixing},i) - \text{RTT}/2,$$

where i=1, ..., n, wherein n is the number of end points, i.e. of the independent video streams being mixed, that is, the number of conference participants, for example.

Due to the specification of the starting point for a group of pictures and the specification of the prediction structure, the sender can calculate a fixed mapping between prediction structure and time basis, and then supply a video stream with a synchronized prediction structure. From experimentally confirmed estimations it turns out that the accuracy of the Network Time Protocol (NTP) is about 10 milliseconds here.

Therefore, inaccuracy in of synchronization based on this amounts to a maximum of 20 milliseconds since the end points can deviate in different directions, (i.e. they can "advance or delay"). At a picture refresh rate of 25 Hz, this corresponds to an offset of one frame.

As already mentioned, this offset, if present, can be compensated as described above, by the signaling of the shift. Depending on the application and the embodiment of the invention, precision control of the picture refresh rate can be favorable or desirable. Since the time references can diverge at the individual end points, especially without the use of a common time basis, an offset can build up over time, even for synchronized video streams and for a formally equal picture refresh rate. In order to counteract an offset of this kind, the picture rate of one or several end points can preferably be corrected accordingly. Thus the server preferably sends an instruction to the end point(s) E1 and/or E2 with roughly the following content: "Increase the picture refresh rate by x," wherein a negative value for x should correspond to a reduction in the picture refresh rate.

The correction value x thus can preferably be calculated from the deviation of the input data stream at the reference time as follows:

$$X=[(\text{target picture rate/estimated picture rate})-1]*100\%$$

At an estimated picture rate which corresponds to the number of received pictures in the time interval (thus per time interval).

The described invention, depending on the particular embodiment, will allow the mixing of video streams with a relatively low expense, in particular in comparison to complete transcoding of the video streams being mixed. And the temporal scalability will be retained.

Thus it is possible to adapt the output video stream with respect to the picture refresh frequency and the data rate to the requirements of the application, and specifically for a simultaneously reduced susceptibility to error, preferably by means of a separate fault protection, for example, by means of re-transmissions, for the time basis layer, i.e. the lowest time resolution step. Complex prediction structures in the output video stream, which cannot be mapped under certain circumstances by a video coding standard, can be avoided by means of the invention.

The output video stream generated according to the invention often can be decoded with a smaller memory requirement. An additional delay which is often unavoidable in conventional methods, can be minimized or eliminated entirely with the invented method since the individual input video streams being mixed are not delayed.

The exemplary embodiments of the invention described above can also be combined with each other in an advantageous manner. However, the invention is not restricted to the exemplary embodiments explicitly described above. Based on the above description of the invention, an ordinary person skilled in the art will be inherently placed into a position to find and to implement additional, favorable embodiments.

The invention claimed is:

1. A method for mixing at least two video streams comprising:
    generating a first video stream by a first end point, the first video stream comprising a first temporal sequence of frames;
    generating a second video stream by a second end point, the second video stream comprising a second temporal sequence of frames;
    the first end point sending the first temporal sequence of frames to a mixing device;
    the second end point sending the second temporal sequence of frames to the mixing device;
    the mixing device deriving a synchronization signal from at least one of: the first temporal sequence of frames, the second temporal sequence of frames, and a timing signal;
    the mixing device sending the synchronization signal to at least one of the first end point and the second end point so that subsequent frames of the first temporal sequence and subsequent frames of the second temporal sequence sent to the mixing device are synchronized with each other via synchronized encoding of the first and second subsequent frames by encoders of the first and second end points;
    at least one of the first end point and second end point receiving the synchronization signal;
    at least one of the first end point and the second end point, in response to the received synchronization signal, adjusting encoding of the frames of the first video stream and the frames of the second video stream such that subsequent frames of the first temporal sequence sent to the mixing device and subsequent frames of the second temporal sequence sent to the mixing device are synchronized with each other to have a same predictive structure based on the received synchronization signal;
    the mixing device receiving the subsequent frames of the first temporal sequence and the subsequent frames of the second temporal sequence after having sent the synchronization signal and mixes the received subsequent frames of the first temporal sequence with the received subsequent frames of the second temporal sequence to generate a mixed video stream.

2. The method of claim 1, wherein the synchronized predictive structure of the subsequent frames of the first temporal sequence sent to the mixing device and the subsequent frames of the second temporal sequence sent to the mixing device is configured so that each P-frame of a sequence of P-frames in the subsequent frames of the first temporal sequence has a position corresponding to a respective P-frame of a sequence of P-frames in the subsequent frames of the second temporal sequence.

3. The method of claim 1, wherein the mixing device is a server of a video teleconference system, the first end point is a subscriber terminal and the second end point is a subscriber terminal.

4. The method of claim 1, wherein the synchronization signal contains an information bit identifying a time offset between the positions of I-frames within the subsequent frames of the first temporal sequence sent to the mixing device or within the subsequent frames of the second temporal sequence sent to the mixing device.

5. The method of claim 1, wherein the synchronization signal contains an information item identifying a number of P-frames or number of B-frames to follow an I-frame in at least one of the subsequent frames of the first temporal sequence sent to the mixing device and the subsequent frames of the second temporal sequence sent to the mixing device.

6. The method of claim 1 wherein the synchronization signal is only sent to the second end point and is derived from the first temporal sequence of frames.

7. The method of claim 1 wherein the synchronization signal is sent to both the first end point and the second end point.

8. The method of claim 1, wherein the first end point, second end point, and mixing device are elements of a video conference system and wherein the first and second end points are within a video conference, the method comprising: upon arrival of an additional participant in the video conference, encoding a third video stream from a third end point of the additional participant as non-synchronized for a first time period and subsequently synchronizing said third video stream via communications with the mixing device after the mixing device generates a synchronization signal for the third end point for synchronizing encoding of the third video steam with the encoding of the first video stream and the encoding of the second video stream so that subsequent encoding of frames of the third video stream are encoded to have the same predictive structure as the encoding of the first and second video streams performed by the encoders of the first and second end points.

9. The method of claim 8, comprising signaling before or during synchronization, a desired prediction structure to an encoder of the third end point.

10. The method of claim 1 wherein the synchronization signal is sent to both the first end point and the second end point and the synchronization signal is based on the timing signal.

11. The method of claim 1 wherein the predictive structure defines a group of pictures for encoding of at least one of the first video stream and the second video stream such that the subsequent frames of the first temporal sequence sent to the mixing device and the subsequent frames of the second temporal sequence sent to the mixing device have a same length for individual picture groups.

12. The method of claim 1, wherein the mixing device is a central server and the first end point is a terminal and the second end point is a terminal and wherein the mixed video stream is a lone output of the central server for a teleconference involving the first and second end points.

13. The method of claim 1, wherein the synchronization signal is configured so that the encoder of the first endpoint encodes the subsequent frames of the first temporal sequence and the encoder of the second end point encodes the subsequent frames of the second temporal sequence in a corresponding manner so that I-frames within the subsequent frames of the first temporal sequence correspond with I-frames within the subsequent frames of the second temporal sequence and P-frames within the subsequent frames of the first temporal sequence correspond with P-frames within the subsequent frames of the second temporal sequence.

14. The method of claim 1, wherein the synchronization signal is configured so that each of the subsequent frames of the first temporal sequence is dependent on no more than one preceding frame within the first temporal sequence.

15. The method of claim 14, wherein the synchronization signal is also configured so that each of the subsequent frames of the second temporal sequence is dependent on no more than one preceding frame within the first temporal sequence.

16. The method of claim 1, wherein the synchronization signal is also configured to identify that each group of pictures within the subsequent frames of the first temporal sequence is to start with an I-frame.

17. A video conference system comprising:
a first end point;
a second end point; and
a mixing device;
the first end point generating a first video stream comprising a first temporal sequence of frames;
the second end point generating a second video stream comprising a second temporal sequence of frames;
the first end point sending the first temporal sequence of frames to the mixing device;
the second end point sending the second temporal sequence of frames to the mixing device;
the mixing device deriving a synchronization signal from at least one of: the first temporal sequence of frames, the second temporal sequence of frames, and a timing signal;
the mixing device sending the synchronization signal to at least one of the first end point and the second end point so that subsequent frames of the first temporal sequence and subsequent frames of the second temporal sequence sent to the mixing device are synchronized with each other via synchronized encoding of the first and second subsequent frames by encoders of the first and second end points;
at least one of the first end point and second end point receiving the synchronization signal;
at least one of the first end point and the second end point, in response to the received synchronization signal, adjusting encoding such that subsequent frames of the first temporal sequence sent to the mixing device and subsequent frames of the second temporal sequence sent to the mixing device are synchronized with each other to have a same predictive structure based on the received synchronization signal;
the mixing device receiving the subsequent frames of the first temporal sequence and the subsequent frames of the second temporal sequence after having sent the synchronization signal and the mixing device mixing the received subsequent frames of the first temporal sequence with the received subsequent frames of the second temporal sequence to generate a mixed video stream.

18. The system of claim 17, wherein the mixing device is a server or a central server, the first end point is a terminal and the second end point is a terminal.

19. The system of claim 18, wherein the predictive structure defines a group of pictures for encoding of at least one of the first video stream and the second video stream such that the subsequent frames of the first temporal sequence sent to the mixing device and the subsequent frames of the second temporal sequence sent to the mixing device have a same length for individual picture groups; and
wherein the synchronization signal is configured so that the encoder of the first endpoint encodes the subsequent frames of the first temporal sequence and the encoder of the second end point encodes the subsequent frames of the second temporal sequence in a corresponding manner so that I-frames within the subsequent frames of the first temporal sequence correspond with I-frames within the subsequent frames of the second temporal sequence and P-frames within the subsequent frames of the first temporal sequence correspond with P-frames within the subsequent frames of the second temporal sequence.

20. The system of claim 18, wherein the synchronization signal contains an information bit identifying a time offset between the positions of I-frames within the subsequent frames of the first temporal sequence sent to the mixing device or within the subsequent frames of the second temporal sequence sent to the mixing device.

* * * * *